United States Patent

[11] 3,622,223

| [72] | Inventor | Gordon R. Brakell<br>Hunters, Hill, New South Wales, Australia |
|---|---|---|
| [21] | Appl. No. | 3,471 |
| [22] | Filed | Jan. 16, 1970 |
| [45] | Patented | Nov. 23, 1971 |
| [73] | Assignee | Brakell Products Pty. Limited<br>Leichhardt, New South Wales, Australia |

[54] PROJECTION SCREENS
3 Claims, 3 Drawing Figs.

[52] U.S. Cl. .................................................... 350/129,
204/19
[51] Int. Cl. ...................................................... G03b 21/60
[50] Field of Search ......................................... 350/129,
128, 127; 52/478; 204/19

[56] References Cited
UNITED STATES PATENTS

| 1,936,238 | 11/1933 | King ............................. | 52/483 X |
| 2,096,309 | 10/1937 | Pullen .......................... | 204/19 |
| 2,974,709 | 3/1961 | Gretener ...................... | 350/129 |
| 3,263,561 | 8/1966 | Jackson ........................ | 350/129 |

FOREIGN PATENTS

| 670,605 | 4/1952 | Great Britain ............... | 350/129 |

*Primary Examiner*—Louis R. Prince
*Assistant Examiner*—Denis E. Corr
*Attorneys*—Emory L. Groff and Emory L. Groff, Jr.

ABSTRACT: A projection screen suitable for indoor or outdoor use, the screen being installed as a permanent fixture and consisting of individual reflective sheet metal sheets or tiles fixed in overlapping relationship to form the screen to desired width and height dimensions. Each sheet or tile is embossed with convex reflective surfaces to directionally reflect light from a projection whereby the screen, when formed from a desired number of sheets or tiles, reflects light from a projection within predetermined angles.

PATENTED NOV 23 1971 3,622,223

INVENTOR
GORDON R. BRAKELL
By Emery L. Groff
Atty

PROJECTION SCREENS

The present invention relates to projection screens for use in motion picture theatres and more particularly for such use in outdoor "Drive-In" theatres.

In connection with the projection and display of motion pictures, advertising slides or other projected material, e.g. illustrative data for educational lectures, difficulty has long been encountered by virtue of loss of brightness of a projected image, as viewed by an audience, arising from unwanted wastage of light reflected from a screen. Such light losses are mainly caused by unduly wide scattering or diffusion of incident light and in some cases a measure of absorption of such light by the material comprising a screen.

The difficulties indicated have been found significant in indoor situations and in the past proposals have been made to improve the reflectance of projection screens by employing suitable reflective coatings containing for example lustrous crystalline materials such as guanine or flaked aluminum particles. Nevertheless a significant loss of incident light has been found to occur, despite increased overall reflectance from such brightened screens.

It has further been unsuccessfully proposed to provide screens formed of sheet synthetic plastic material embossed with optical reflecting elements, which direct the incident light back toward an audience in a cone broadly confined to the lateral and vertical disposition of an audience.

Such proposals have not been generally adopted, due it is believed to the optical components embossed on sheet synthetic materials lacking accuracy with consequent misdirection and loss of incident light and lack of reflectance due to reliance upon flaked aluminum as the reflective material.

It will be further appreciated that loss of illumination of a projection screen constitutes a greater problem in outdoor "Drive-In" theatres, due to the extensive spread of members of an audience located in automobiles, and also due to the fact that screening of a film may commence during a twilight period.

Again the types of screens discussed in relation to indoor projection of pictures are of a relatively fragile nature and cannot be employed in exposed outdoor situations involving extremes of temperature and buffeting by wind or storm.

The primary object of the present invention is to overcome the foregoing and other deficiencies of prior art procedures by providing a projection screen formed of reflective metal sheets or tiles embossed with directional light-reflective elements, and to provide such sheets or tiles.

A further object of the invention is to provide a screen, of the kind indicated, formed of individual lustrous metal sheets or tiles adapted to closely about to form an enduring screen under outdoor conditions.

Another object of the invention is to provide a method of achieving a reflective metal projection screen for showing of pictures in either indoor or outdoor theatres.

Other objects and advantages of the invention will be made apparent in the following description.

A projection screen in accordance with the present invention is formed of reflective metal sheet material embossed with convex light-reflective elements of a size not resolvable to the eye of observers, which direct incident light toward an audience viewing said screen.

The invention also comprises a method of achieving a reflective metal projection screen in accordance with the invention, whereby metal sheets or tiles are embossed with a pattern of light-reflective elements of convex contour and each element has a focal length substantially constraining reflectance of incident light from a film projector in both horizontal and vertical directions toward an assembled viewing audience, said plates being secured to a supporting framework and closely abutting against one another to provide a screen of any predetermined size.

It is to be appreciated that the optical effect of the convex reflective elements embossed on lustrous sheet metal, as for example, stainless steel or polished aluminum has relation to the screen size, audience spread and the angle of incidence of a projection beam.

These matters have been the subject of study and reduction to mathematical analysis. Such analysis takes into account the attitude of a screen from the vertical and its possible curvature as well as a patterned arrangement of reflective elements over its surface differing in their line of directing reflected light, having regard to, for example, the location near the center or in marginal areas of a screen.

The invention is now more fully described with reference to preferred embodiments, illustrated in the accompanying drawings in which.

Figure 1:
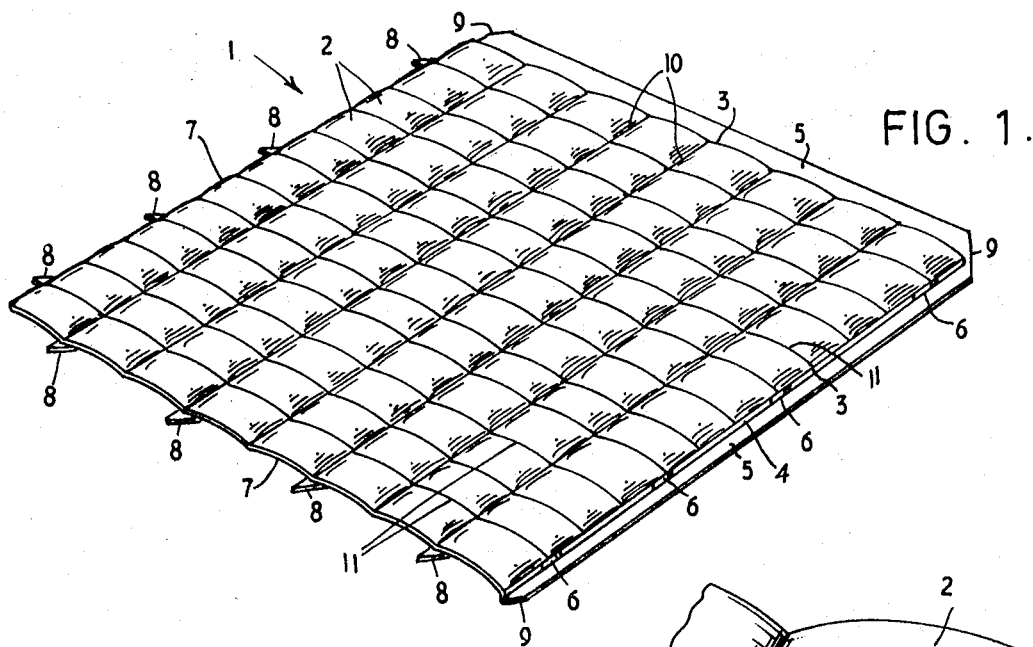
FIG. 1 shows a perspective view a unit sheet or tile of lustrous aluminum embossed with convex reflective elements.
Figure 2:
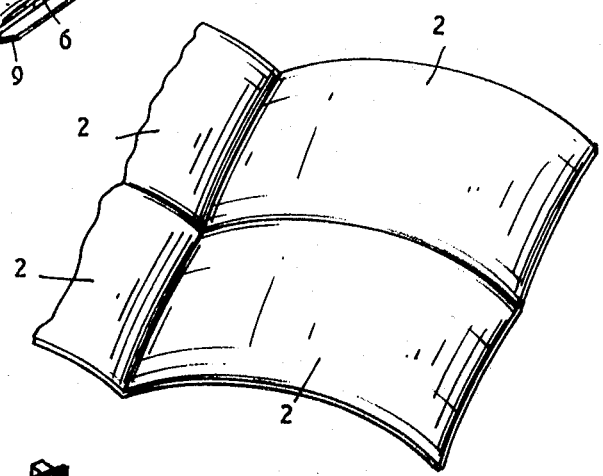
FIG. 2 shows an enlarged fragmentary perspective view of part of the sheet or tile unit of FIG. 1.

Referring to FIGS. 1 and 2; each unit sheet or tile 1 is formed from sheet aluminum and has reflective elements 2 embossed thereon. The sheets or tiles 1 are chemically brightened by being chemically polished and then flash anodized and the reflective elements 2 constitute segments of a sphere of predetermined radius. Each sheet or tile 1 has two adjacent sides 3 thereof stepped down from the reflective elements as at 4 and blended into a flat side flange 5. Spaced slots 6 are formed through the stepped parts 4 between the flanges 5 and the edge of the adjacent row of reflective elements 2. The remaining two adjacent sides 7 of each sheet or tile 1 has tongues 8 formed thereon opposite the slots 6 and of less width than said slots 6, for insertion in the slots 6 of two adjacent sheets or tiles 1 when the sheets or tiles are assembled to form a screen. Also, the side flanges 5 are mitred as at 9 to eliminate multiple overlaps at the corners of the sheets or tiles 1 when they are assembled.

In the illustrated example (not drawn to scale) the aluminum sheets or tiles 1 are about 11 inches × 11 inches for example, and the convex reflective elements 2 have rectangular dimensions of 0.35 inches × 0.217 inches and constitute segments of the surface of a sphere of radius 0.413 inches.

A sheet or tile 1 embossed with convex elements 2 of the dimensions indicated will directionally reflect light from a projection within an angle of 50° either side of a perpendicular bisector and at an angle of 30° in the vertical plane, thus constraining the reflected light to the spread of viewers and thus enhancing the intensity of a reflected picture.

A screen composed of convex elements 2 developed from a sphere of radius 0.59 inches and each having rectangular dimensions of 0.50 inches × 0.38 inches gave comparable results. The increase in brightness of a picture reflected from screens composed of the Applicant's embossed sheets or tiles to a viewer, is about 3:1 compared with existing white projection screens.

Further, referring to FIGS. 1 and 2, it is apparent that the convex reflecting elements 2 are bounded by longitudinal and transverse indented lines 10–11. Along these lines no reflection occurs. Accordingly the sheets or tiles when located side-by-side terminate on an indented line and the small expansion gap between units is invisible to viewers of a screen, thereby facilitating erection of screens without impairing the efficiency of a screen.

One way of constructing an outdoor projection screen, in accordance with the invention, is now described with reference to FIG. 3 of the drawings.

In many outdoor (drive-in) picture theatres there is a preexisting structure, serving as a screen supporting structure to which the Applicant's screens may be secured or in a new venue such a screen supporting structure would need to be erected in accordance with ordinary techniques.

Figure 3:
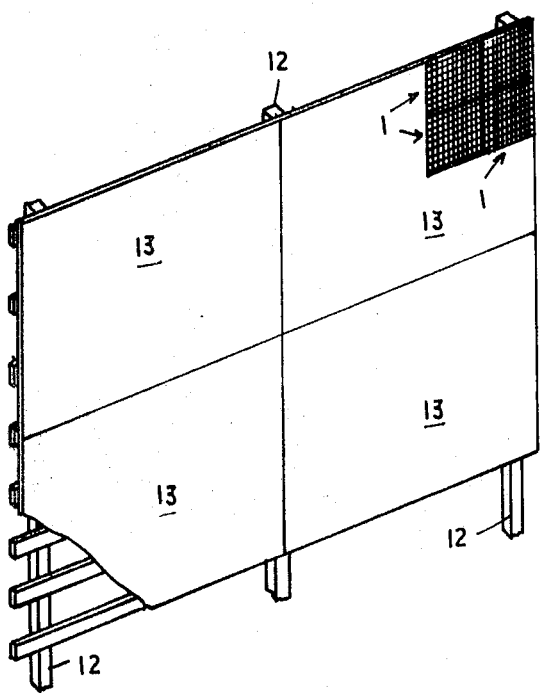
FIG. 3 shows a construction of a projection screen embodying the unit sheets or tiles illustrated in FIGS. 1 and 2.

In FIG. 3, a screen-supporting structure 12 supports flat panels 13, which may be plywood panels for example secured to the structure 12 in any desired manner. Each sheet or tile 1 is stapled through its side flanges 5 to a panel 13, with the tongues 8 thereof entered into the slots 6 of two adjacent sheets or tiles 1. As seen in FIG. 3, the sheets or tiles 1 forming the border of the screen have a flanged side 5 thereof located at the edge of the screen and the corner sheet or tile 1 has its two flanged sides 5 forming the corner of the screen.

The sheets or tiles 1 are secured on the panels 13 in courses, with the flanged sides 5 thereof overlapped by a row of reflective elements 2 of the adjacent sheets or tiles 1. The edge 7 of this row of reflective elements 2 abuts the step 4 of a flanged side 5 with the tongues 8 entered into the slots 6. Thus only a very narrow gap exists between abutting sheets or tiles 1, which nevertheless can still expand and contract individually without buckling, as the tongues 8 are of less width than the slots 6.

From the foregoing, it will be appreciated that an arrangement is provided to maintain suitable attachment of the tiles while accommodating subsequent expansion and contraction thereof. This expansion is not cumulative since each tile is anchored to the support panel 13 by means of suitable fasteners passing through the two adjacent side flanges and any resultant variation in size of each tile will be taken care of by means of the floating connection offered by its tongues 8 slidably fitting within the stationary slots 6 of the next adjacent tiles.

While the preferred reflective metal employed in the construction of the Applicant's embossed reflect sheets or tiles is aluminum or an aluminum based alloy, by virtue of its economical cost and suitability for accurate forming in a die and its retention of chemically imparted luster when lightly anodized e.g. an anodized coating of the order of $4 \times 10^{-4}$ inches other lustrous metals or alloys can be utilized as for example tiles of stainless steel.

For indoor purposes, where the sound is relayed through a projection screen to an audience, the Applicant's embossed metal sheets or tiles may be finely perforated, thus passing the sound from loud speakers behind a screen without appreciable loss of screen reflectance.

It will be further appreciated that the light-reflective elements may be themselves oriented with reference to the plane of a screen and/or the screen itself either tilted toward an audience or be somewhat curved to enhance direction of reflected light.

Improved light reflectance from a projection screen obviates or minimizes difficulties encountered with projection, particularly in "Drive-In" open air theatres.

With present projection equipment and generally large and poor quality screens, the projection equipment is required to be operated at maximum light intensity. Under these conditions excessive heat is applied to film causing damage by fading the colors of color film or even damaging film causing breakage.

The Applicant's screens with their substantially improved reflectance coupled with their capacity to avoid loss by scattering of light outside the viewing area occupied by an audience permit running of projection equipment without overload.

Furthermore, with the Applicant's high reflectance and directional reflectance pictures may be viewed in twilight an advantageous circumstance in regions where summer daylight saving has or may be adopted.

Variations and modifications may be made without departing from the scope of the invention as defined in the appended claims.

I claim:

1. A projection screen for use primarily in an outdoor theater, said screen formed of a plurality of individual reflective metal tiles each embossed with light reflective elements of a minute size not resolvable to the eye of observers and which direct incident light toward an audience viewing said screen, a support on which said tiles are individually mounted, said tiles being movable individually on said support under the influence of expansion and contraction, said tiles also being of small edge dimensions compared to the edge dimensions of said screen.

2. A reflective metal tile according to claim 1, said tile having two adjacent sides thereof stepped downwardly from the adjacent row of reflective elements and blended into flat side flanges, said tile also having spaced slots formed through the stepped parts between said flanges and the adjacent rows of reflective elements, and said tile further having tongues formed on the remaining two sides thereof opposite said slots and of less width than the slots.

3. A reflective metal tile according to claim 1 embossed with contiguous convex light reflecting elements which reflect the light from a film projector within an angle of 50° on either side of a vertical bisector of a screen composed of such tiles and within an angle of 30° with reference to the horizontal bisector of the said screen.

* * * * *